US012654621B2

(12) United States Patent
Morey et al.

(10) Patent No.: US 12,654,621 B2
(45) Date of Patent: Jun. 16, 2026

(54) VEHICULAR OVERHEAD CONSOLE

(71) Applicant: Magna Mirrors of America, Inc.,
Holland, MI (US)

(72) Inventors: Rudy A. Morey, Hudsonville, MI (US);
Connor G. Cervone, Byron Center, MI
(US)

(73) Assignee: Magna Mirrors of America, Inc.,
Holland, MI (US)

( * ) Notice: Subject to any disclaimer, the term of this
patent is extended or adjusted under 35
U.S.C. 154(b) by 347 days.

(21) Appl. No.: 18/413,293

(22) Filed: Jan. 16, 2024

(65) Prior Publication Data

US 2024/0239272 A1     Jul. 18, 2024

Related U.S. Application Data

(60) Provisional application No. 63/480,306, filed on Jan.
18, 2023.

(51) Int. Cl.
B60R 7/04          (2006.01)

(52) U.S. Cl.
CPC ...................................... B60R 7/04 (2013.01)

(58) Field of Classification Search
CPC .... B60R 7/04; B60R 7/05; B60R 7/08; B60R
7/081; B60R 7/082; B60R 7/084; B60R
7/085; B60R 7/087
USPC ...................................................... 296/24.34
See application file for complete search history.

(56) References Cited

U.S. PATENT DOCUMENTS

| | | |
|---|---|---|
| 5,223,814 A | 6/1993 | Suman |
| 5,469,298 A | 11/1995 | Suman et al. |
| 5,548,492 A | 8/1996 | Hansen et al. |
| 5,576,898 A | 11/1996 | Rubin |
| 6,690,268 B2 | 2/2004 | Schofield et al. |
| 7,289,037 B2 | 10/2007 | Uken et al. |
| 7,360,932 B2 | 4/2008 | Uken et al. |
| 7,626,749 B2 | 12/2009 | Baur et al. |
| 8,049,640 B2 | 11/2011 | Uken et al. |
| 8,277,059 B2 | 10/2012 | McCabe et al. |
| 8,529,108 B2 | 9/2013 | Uken et al. |
| 9,405,120 B2 | 8/2016 | Graf et al. |
| 10,017,114 B2 | 7/2018 | Bongwald |
| 10,046,706 B2 | 8/2018 | Larson et al. |
| 10,166,924 B2 | 1/2019 | Baur |
| 10,272,833 B2 | 4/2019 | Snider |
| 10,421,404 B2 | 9/2019 | Larson et al. |
| 10,427,503 B2 | 10/2019 | Snider |
| 10,442,360 B2 | 10/2019 | LaCross et al. |
| 10,501,977 B2 | 12/2019 | Snider |

(Continued)

*Primary Examiner* — Steven O Douglas

(74) *Attorney, Agent, or Firm* — HONIGMAN LLP

(57)          ABSTRACT

A vehicular overhead console includes a housing and a pair
of cover panels. Each cover panel is disposed at a respective
opening of a pair of openings of the housing and includes a
compartment configured to accommodate an item. Each
cover panel is adjustable between a closed position and an
opened position. A mechanical actuator is accommodated by
the housing and coupled to each cover panel. The mechanical actuator is configured to move the cover panels together
and in tandem between the closed and opened positions. The
mechanical actuator includes a latch mechanism that releasably retains the cover panels in the closed positions. Responsive to at least one of the cover panels being manually
moved from the closed position further away from the
opened position, the latch mechanism releases the cover
panels to allow the cover panels to move toward the opened
positions.

20 Claims, 16 Drawing Sheets

(56)     References Cited

U.S. PATENT DOCUMENTS

| 10,559,153 B2 | 2/2020 | Snider et al. |
|---|---|---|
| 11,331,984 B2 | 5/2022 | Gustafson |
| 11,639,134 B1 | 5/2023 | Huizen et al. |
| 11,780,372 B2 | 10/2023 | Sobecki et al. |
| 11,930,264 B2 | 3/2024 | Conger et al. |
| 2001/0013825 A1 | 8/2001 | DeLine et al. |
| 2002/0093826 A1 | 7/2002 | Bos et al. |
| 2002/0190872 A1 | 12/2002 | Suman et al. |
| 2003/0020603 A1 | 1/2003 | DeLine et al. |
| 2004/0184282 A1 | 9/2004 | Nishijima et al. |
| 2005/0134073 A1 | 6/2005 | Tokutomi et al. |
| 2019/0118717 A1 | 4/2019 | Blank et al. |
| 2019/0146297 A1 | 5/2019 | Lynam et al. |
| 2019/0210615 A1 | 7/2019 | Caron et al. |
| 2019/0258131 A9 | 8/2019 | Lynam et al. |
| 2020/0143560 A1 | 5/2020 | Lu et al. |
| 2020/0320320 A1 | 10/2020 | Lynam |
| 2020/0377022 A1 | 12/2020 | LaCross et al. |
| 2021/0155167 A1 | 5/2021 | Lynam et al. |
| 2021/0162926 A1 | 6/2021 | Lu |
| 2021/0188092 A1 | 6/2021 | Peterson |
| 2021/0245662 A1 | 8/2021 | Blank et al. |
| 2021/0291739 A1 | 9/2021 | Kasarla et al. |
| 2021/0323473 A1 | 10/2021 | Peterson et al. |
| 2022/0111857 A1 | 4/2022 | Kulkarni |
| 2022/0242438 A1 | 8/2022 | Sobecki et al. |
| 2022/0254132 A1 | 8/2022 | Rother |
| 2023/0010223 A1 | 1/2023 | Andersson et al. |
| 2023/0078512 A1 | 3/2023 | Peterson et al. |
| 2023/0286441 A1 | 9/2023 | Schnellbach et al. |

VEHICULAR OVERHEAD CONSOLE

CROSS REFERENCE TO RELATED APPLICATION

The present application claims the filing benefits of U.S. provisional application Ser. No. 63/480,306, filed Jan. 18, 2023, which is hereby incorporated herein by reference in its entirety.

FIELD OF THE INVENTION

The present invention relates generally to the field of overhead consoles and associated accessories for vehicles.

BACKGROUND OF THE INVENTION

It is known to provide an overhead console at a roof/headliner of a vehicle. Overhead consoles are typically mounted to the vehicle headliner and typically include lighting features and control switches.

SUMMARY OF THE INVENTION

A vehicular overhead console includes a housing configured to attach at an interior portion of a cabin of a vehicle. The housing includes a pair of openings formed through an exterior wall of the housing. The pair of openings are spaced from one another along the exterior wall of the housing. Each cover panel of a pair of cover panels is disposed at a respective opening of the pair of openings of the housing. Each cover panel includes a respective compartment that is configured to hold a respective item. Each cover panel is adjustable between a closed position, where the cover panel extends along the respective opening and the compartment of the respective cover panel is within the housing, and an opened position, where the cover panel is moved at least partially away from the respective opening to provide access to the respective compartment. A mechanical actuator is accommodated by the housing and coupled to each cover panel of the pair of cover panels. The mechanical actuator is configured to move the pair of cover panels together and in tandem between the respective closed positions and the respective opened positions. The mechanical actuator includes a latch mechanism that, with the pair of cover panels in the respective closed positions, releasably retains the pair of cover panels in the closed positions. Responsive to at least one of the cover panels being manually moved from the closed position and further away from the opened position, the latch mechanism releases the pair of cover panels to allow the pair of cover panels to move toward the respective opened positions.

These and other objects, advantages, purposes and features of the present invention will become apparent upon review of the following specification in conjunction with the drawings.

DESCRIPTION OF THE PREFERRED EMBODIMENTS

Figure 1:
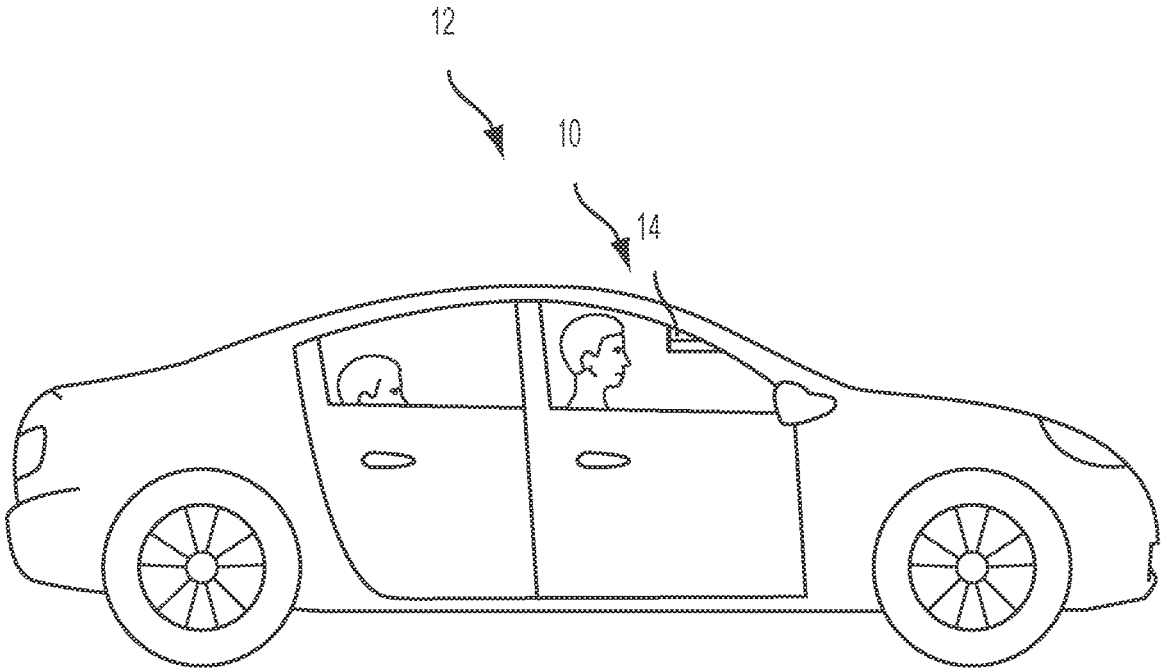
FIG. 1 is a side view of a vehicle with a vehicular overhead console disposed at an interior portion of an interior cabin of the vehicle.
Figure 2:
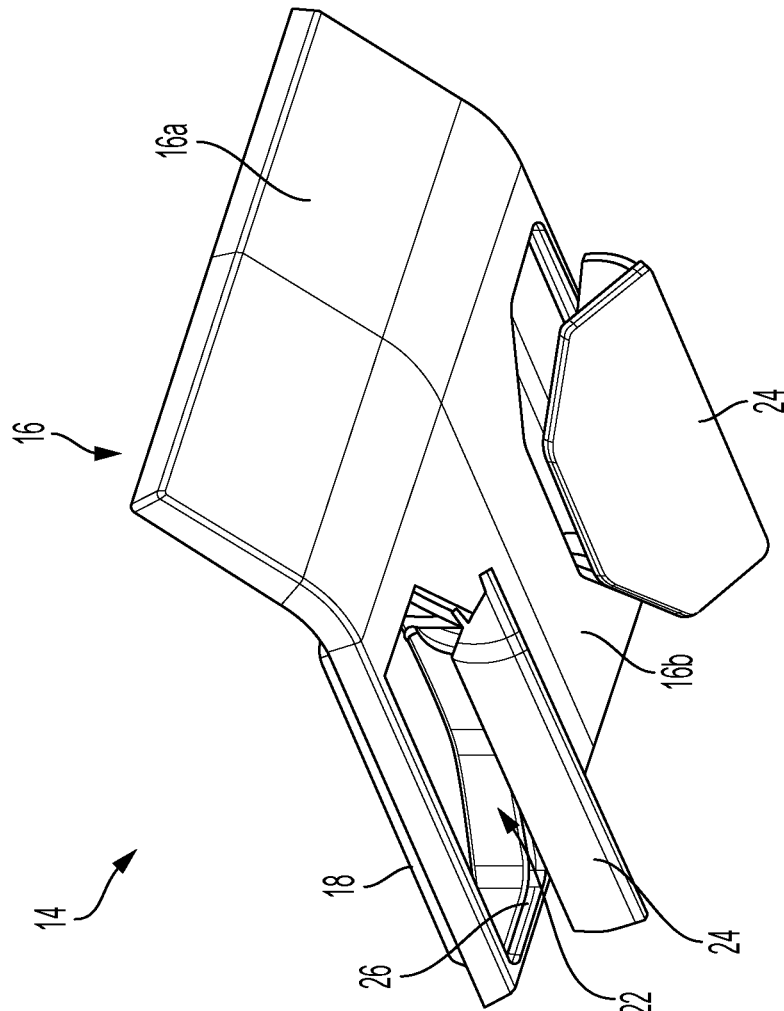
FIG. 2 is a perspective view of a vehicular overhead console assembly.
Figure 4:
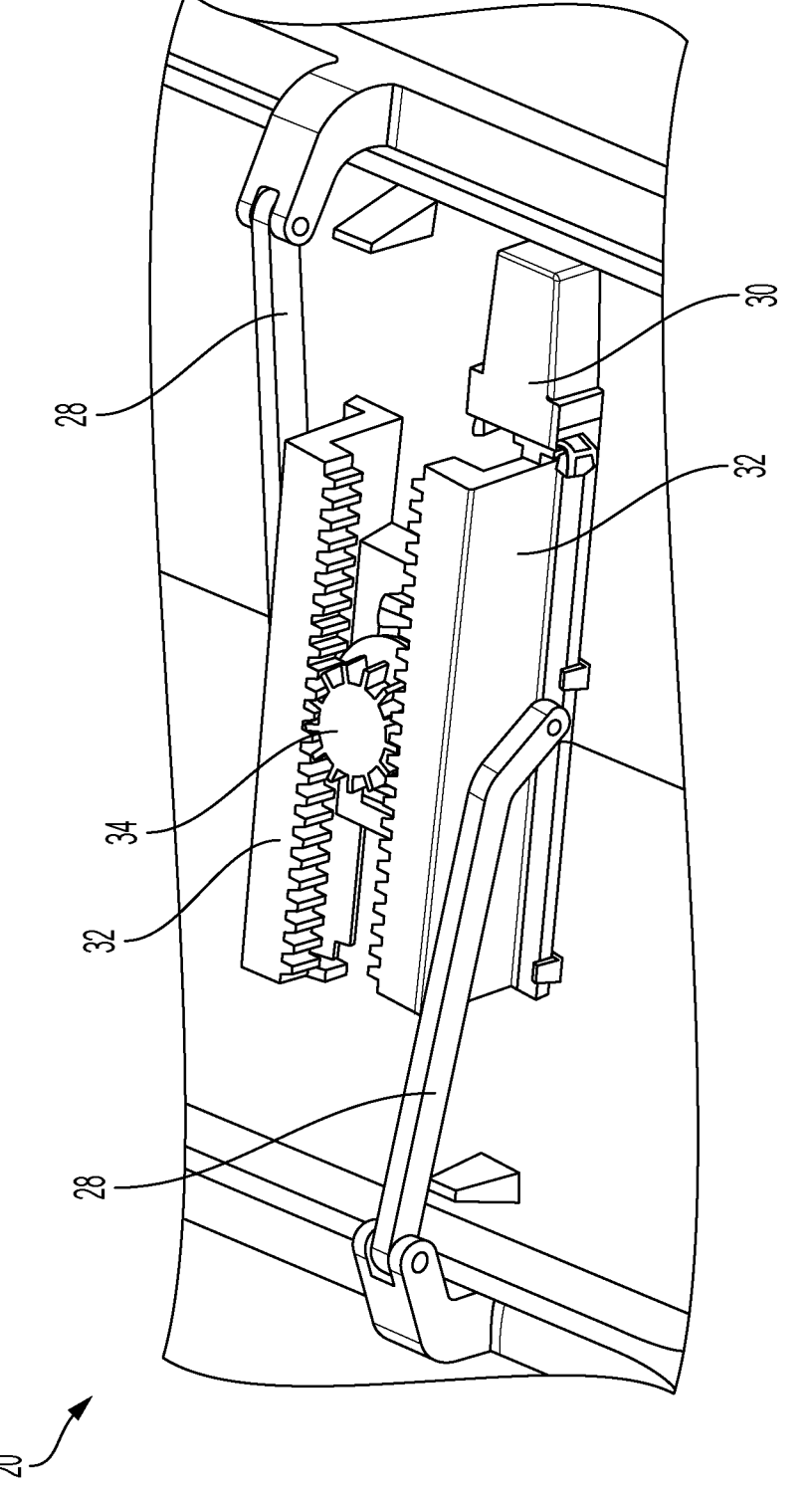
FIG. 4 is an enlarged view of a mechanical actuator of the vehicular overhead console assembly of FIG. 2.
Figure 5:
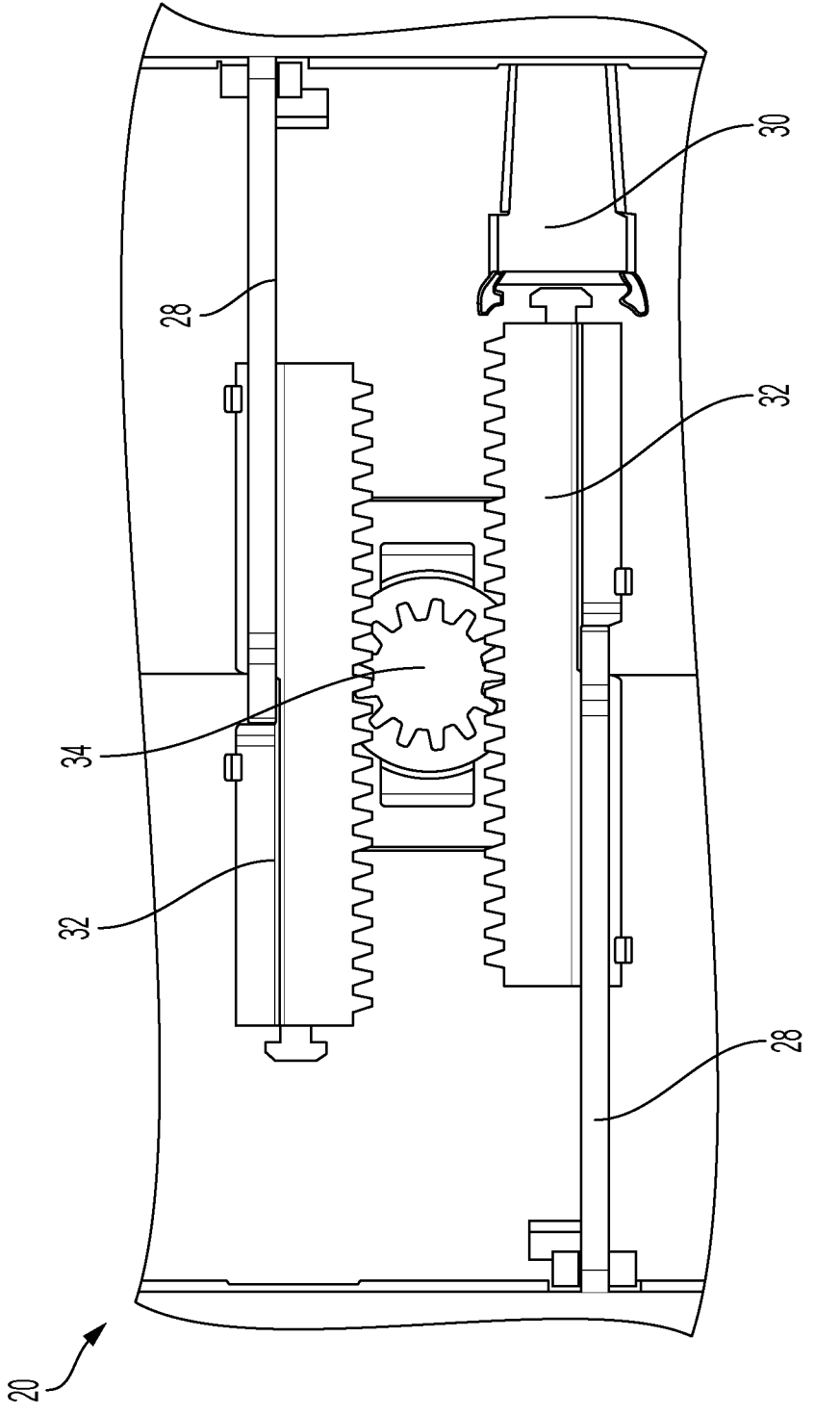
FIG. 5 is a plan view of the mechanical actuator, showing gear bars, attachment arms, and a rotary damper of the mechanical actuator.
Figure 6:
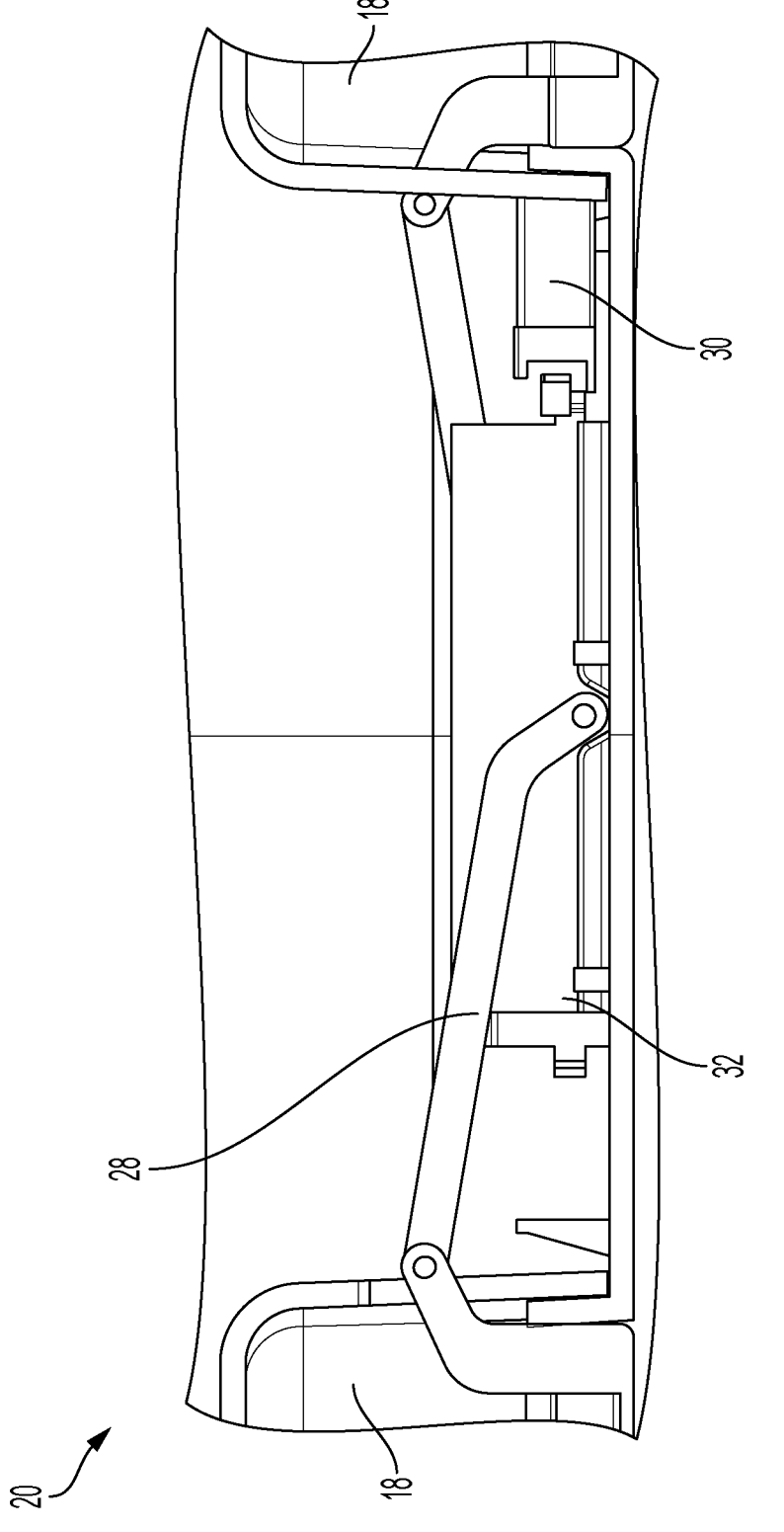
FIG. 6 is an enlarged view of the vehicular overhead console assembly of FIG. 2, with the mechanical actuator attached to cover panels of the vehicular overhead console assembly.
Figure 7:
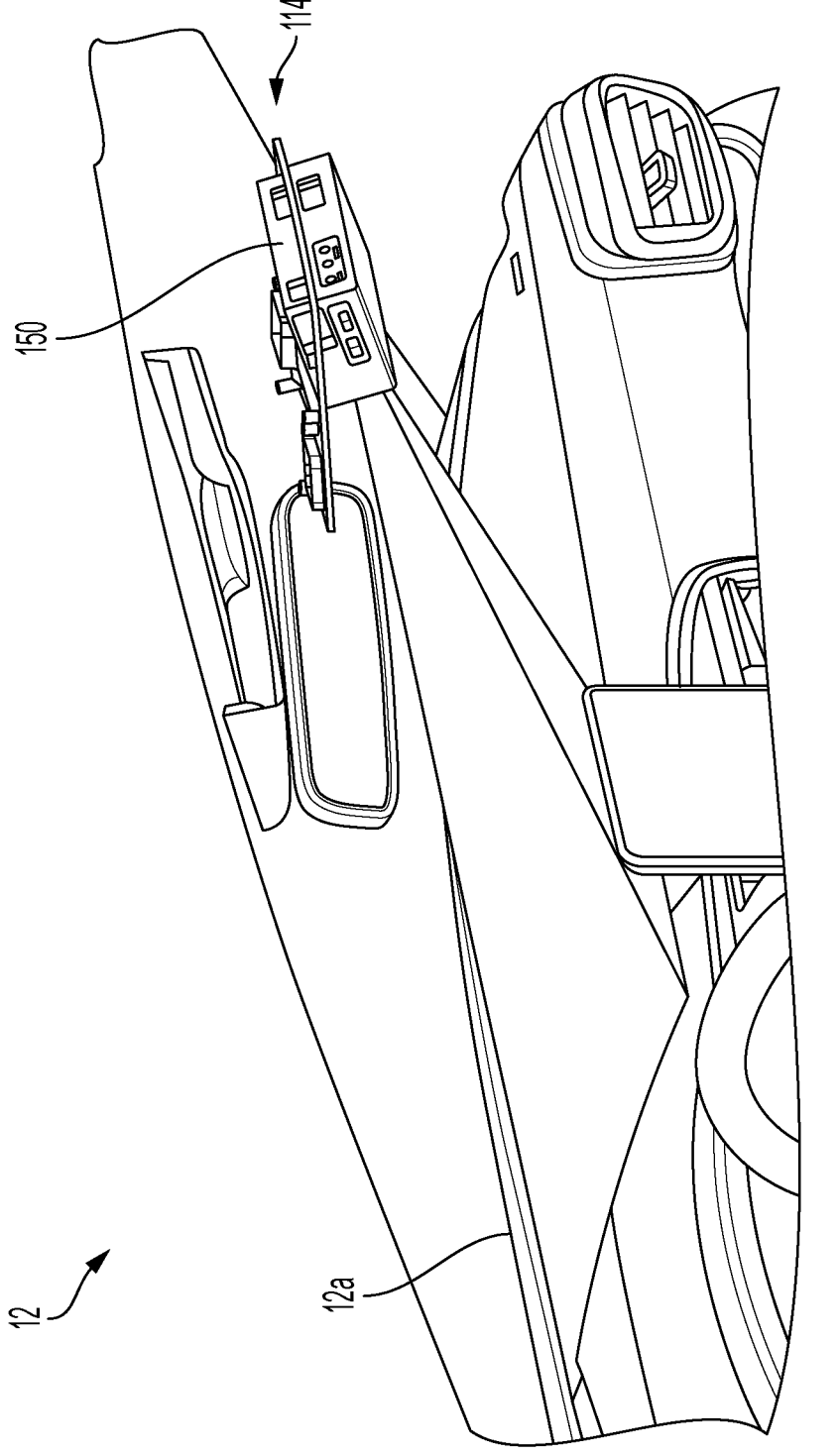
FIGS. 7 and 8 are perspective views of another vehicular overhead console assembly with a projection system projecting an image onto a dashboard of the vehicle.
Figure 8:
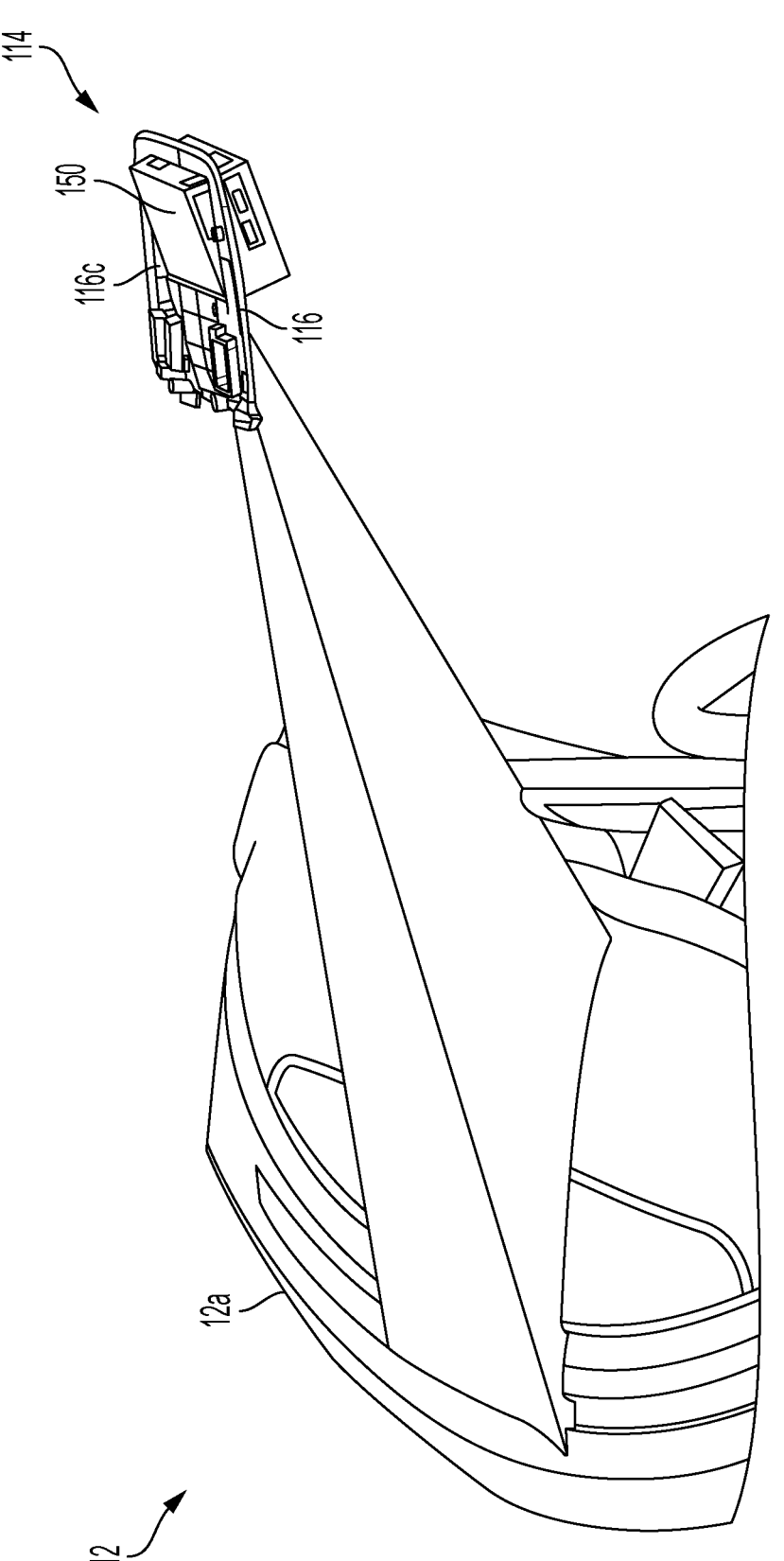

Referring now to the drawings and the illustrative embodiments depicted therein, a vehicular accessory system 10 is disposed at an interior portion or cabin of a vehicle 12 (FIG. 1). The system 10 includes an overhead console assembly 14. The overhead console assembly 14 is mounted at the interior portion of the vehicle (such as to an upper edge region of the windshield or the headliner of the vehicle, and the like) and extends rearward from the windshield along the headliner. The overhead console assembly 14 includes a chassis or shell or body portion 16 that accommodates one or more pockets 18 and a mechanical actuator or gear assembly 20 (FIGS. 2 and 4). The pockets 18 may be integrally formed with the body portion 16 or attached at the body portion 16 and aligned with respective openings 26 formed through the body portion 16 so that each pocket 18 provides a cavity 22 that extends from the opening through the body portion 16. One or more storage covers 24 are adjustably disposed at the body portion 16 at or near the respective pockets 18 and are each movable relative to the body portion 16 between a closed position or stowed position, where the cover 24 extends over or closes over the cavity 22 of the respective pocket 18, and an opened position, where the cover is moved away from the respective pocket 18 (e.g., pivoted relative to the body portion 16 away from the pocket) to allow access to the cavity 22 of the respective pocket 18. Although described herein as having a pair of pockets 18 defining cavities 22 and having respective covers 24 for closing and opening the respective storage compartments, it should be understood that the overhead console 16 may include any suitable number of storage compartments, such as one or more, three or more, and the like.

In the illustrated example of FIGS. 2-5, the body portion 16 of the overhead console assembly 14 may be mounted at the upper edge region of the windshield or at the headliner or at any intermediate structure of the vehicle roof (such as at a forward frame portion of a sunroof or panoramic roof of the vehicle) at a mounting region. For example, an attaching portion 16a of the body 16 may attach at the windshield or to the panoramic roof, and may be fastened to the headliner or to the frame of the windshield or panoramic roof via a plurality of fasteners (e.g., snap fasteners or clips or threaded fasteners or screws). A housing portion or storage portion 16*b* extends from the attaching portion 16*a* rearward along the headliner and/or panoramic roof of the vehicle, and the housing portion 16*b* accommodates the gear assembly 20, pockets 18, and storage covers 24.

Electronic content or features (e.g., circuitry, one or more light sources, one or more user actuatable inputs, one or more control modules, and the like) may be accommodated by the body portion 16 of the overhead console assembly 14, such as within an interior portion of the body portion 16 or between the body portion 16 and the vehicle headliner and/or panoramic roof. The body portion 16 may be at least partially opaque to hide or render covert the electronic content or features from view of occupants within the vehicle 12. Optionally, the body portion 16 may be at least partially transparent or translucent or light transmitting to allow viewing of at least one component through the body portion 16 and/or to allow a light source to emit light through the body portion 16 for illuminating at least a portion of the cabin of the vehicle.

The openings or apertures 26 are formed in the housing portion 16*b* and receive the storage covers 24 thereat when the storage covers are closed. In other words, when the storage covers 24 are moved to the closed or stowed position, the storage covers 24 extend over and along the openings 26 to cover the cavities 22 of the respective pockets 18 and the storage covers 24 may be at least partially received within the apertures 26. Thus, the storage covers 24 and the pockets 18 cooperate to provide the storage cavity within the overhead console, such as for storing sunglasses or the like.

Figure 3:
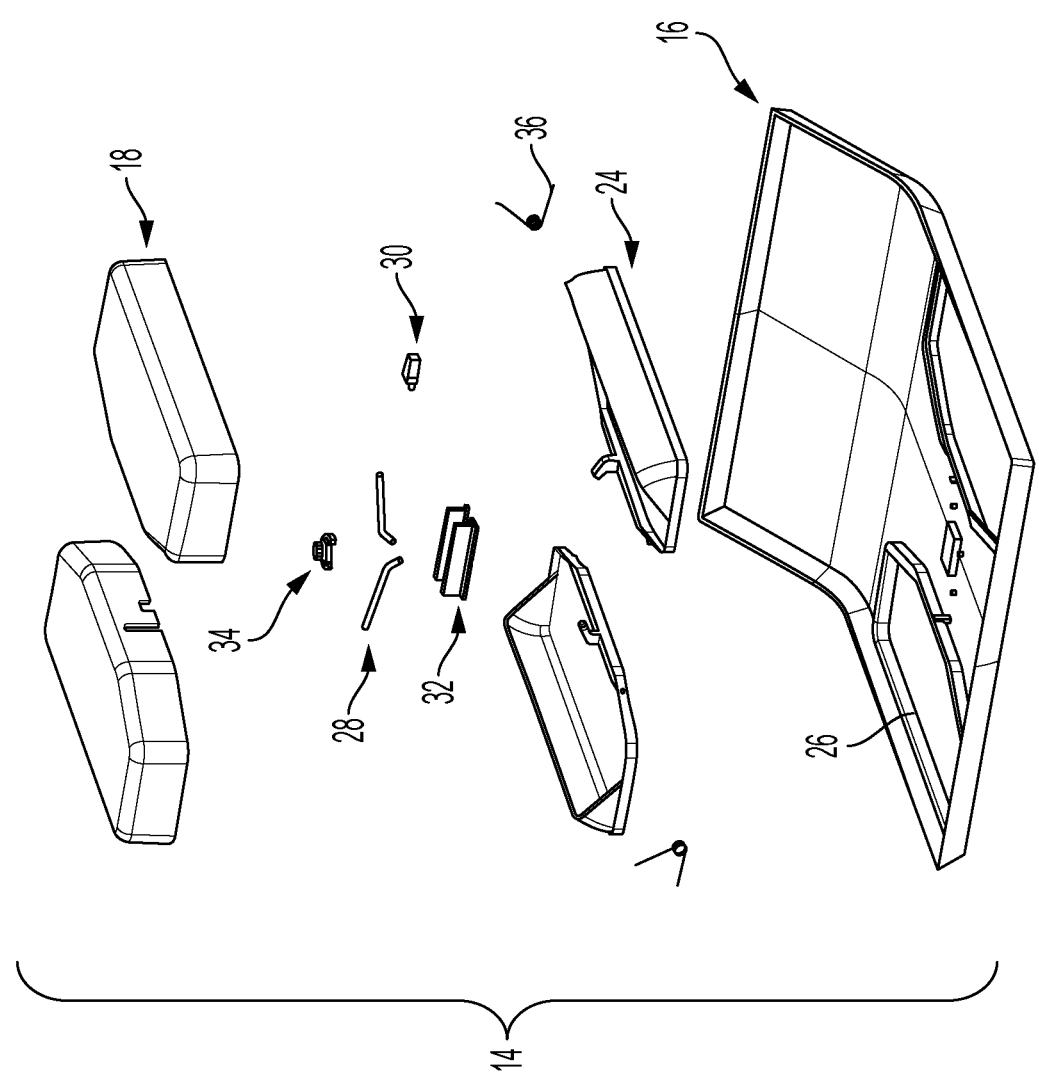
FIG. 3 is an exploded view of the vehicular overhead console assembly of FIG. 2.

As shown in FIGS. 2 and 3, each storage cover 24 includes a cover portion 24*a* and a lip or shelf 24*b* extending from an edge region of the cover portion 24*a*. The shelf 24*b* and the cover portion 24*a* cooperate to form a compartment at the rear or inner side of the storage cover 24. When the storage cover 24 is in the closed position, the cover portion 24*a* extends over and along the opening 26 and the shelf 24*b* extends at least partially within the cavity 22. The cover portion may be generally planar or contoured to generally correspond with the outer surface of the body portion of the console when the storage cover is in the closed position. An object (e.g., sunglasses) may be disposed within the cavity 22 and rest on the interior surface of the cover portion 24*a* between the shelf 24*b* and the cover portion 24*a* within the compartment. When the storage cover 24 is in the opened position (FIG. 2), the storage cover 24 is pivoted at least partially away from the body portion 16, such that the cover portion 24*a* is moved away from the opening and the shelf 24*b* is positioned so that the object may rest at least partially along the shelf 24*b* and the object is retained within the compartment between the shelf 24*b* and the cover portion 24*a*. Each storage cover 24 and cavity 22 may cooperate to provide a capacity to store objects, such as up to a package size of approximately 150 mm by 55 mm by 35 mm or greater. The object(s) may be supported by the shelf 24*b* in the opened position of the storage covers 24 and may be supported by the cover portion 24*a* (within the cavity of the pocket 18) in the stowed position of the storage covers 24.

The pockets 18 may be disposed at or extend from the apertures 26 of the body portion 16, such that the storage covers 24 may be partially received in the pockets and conceal the pockets 18 when the covers are closed. As discussed further below, the storage covers 24 may be retained or latched in the stowed position via the mechanical actuator or gear assembly 20, which latches the storage covers at the apertures 26 and/or the pockets 18 in the stowed position of the storage covers 24. For example, the storage covers 24 may be generally flush with the body portion 16 in the stowed position and may have a butterfly configuration (FIG. 2) relative to the body portion 16 in the opened position. That is, when the overhead console includes two storage covers 24 and the storage covers 24 are both moved to the opened position, the storage covers 24 may open in opposite facing directions, such as to provide access respectively to the driver and passenger of the vehicle.

Referring to FIGS. 3-6, the mechanical actuator or gear assembly 20 may be accommodated within the housing portion 16*b* of the body 16 and disposed adjacent to one or more openings 26, such as between the two openings 26 of the illustrated example. The gear assembly 20 is coupled to one or more of the storage covers 24 for moving the covers 24 between the respective closed and opened positions. The gear assembly or actuator 20 is attached to the one or more storage covers 24 via respective coupler links or attachment arms 28 and retains the storage covers 24 in the respective closed positions via a push-push latch or push latch or latch 30 engaging with one or more linear gears or racks or slider gears or gear bars 32. The gear assembly 20 also includes a spur gear element or rotary damper or damper 34 coupled to the one or more linear gears 32. One or more torsion springs or biasing members 36 may bias the storage covers 24 toward the respective opened positions and thus cooperate with the latch 30 and the gear bars 32 to pivot the storage covers 24 respectively between the closed position and the opened position. The gear bars 32, the latch 30, and the biasing members 36 may be collectively referred to as a crank-slider mechanism that cooperates with the damper 34 to simultaneously deploy the twin storage compartments. For example, the geared rotary damper 34 with the crank-slider mechanism couples the deployment of the storage covers 24, such that both storage covers 24 and the respective storage compartments can be opened and closed with a single push-push latch 30.

In other words, each of the covers 24 is coupled to a respective linear gear 32 via an attachment arm 28. The linear gears 32 translate along opposite sides of the rotary damper 34 when the covers 24 are moved between the respective closed and opened positions and the position of the rotary damper 34 along the linear gears 32 corresponds to the position of the covers 24. Because the linear gears 32 are both keyed to the rotary damper 34, the linear gears 32 move in opposite directions as the rotary damper 34 rotates and the covers 24 move together and in tandem between the respective opened and closed positions. The latch 30 engages an end of one of the linear gears 32 when the cover 24 is in the closed position to retain the covers 24 in the closed position and the latch 30 releases the linear gear 32 when one of the covers 24 is moved from the closed position further away from the opened position (e.g., when a user depresses the cover 24 toward the cavity 22) to allow the linear gear 32 to move relative to the rotary damper 34. Because movement of one linear gear 32 is keyed to movement of the other linear gear 32, movement of either cover 24 from the closed position further away from the opened position releases the latch 30. The biasing member 36 may urge the covers 24 toward the respective opened positions so that when the latch is released, the covers 24 move together toward the respective opened positions. Optionally, the biasing member 36 may bias the covers 24 toward the respective closed position so that, when the latch 30 is released, gravity may move the covers toward the opened positions and the biasing member 36 may enable a slow or controlled opening movement.

Thus, when the latch 30 is actuated, it may cause or allow movement (such as movement caused by the biasing force of the torsional spring) of one of the gear bars 32, which, when translated along the body portion 16, causes rotation of the gear element or damper 34, which imparts a corresponding translational movement in the opposite direction of the other gear bar. Such translational movement may be caused by the torsional spring (or other biasing element), such that, when the latch is actuated, the gear bar is released by the latch, whereby the biasing force of the spring imparts the translational movement of the gear bar.

The compartments may be simultaneously closed by manually pushing one of the covers 24 upward, whereby the respective gear bar moves relative to the gear element or damper 34, which imparts the opposite movement of the other gear bar to close the other storage cover 24. Optionally, an electrically powered motor may rotate the gear element or damper 34 to impart opposite translational movement of the gear bars to open and close the storage covers, such as responsive to the latch 30 being actuated or responsive to a user actuatable input.

The butterfly configuration of the storage pockets 24 may provide a styling differentiator, such that the butterfly overhead console 14 may add visual flair and intrigue while also increasing overhead storage capacity available to a driver of the vehicle 12. The butterfly overhead console 14 may increase, such as double, the available storage capacity. For example, the storage pockets 24 of the overhead console assembly 14 centralizes sunglasses storage for a driver and a front passenger of the vehicle 12, such that both the driver and the front passenger may store items, such as sunglasses, in the storage pockets 24. This configuration increases storage flexibility of the overhead console assembly 14 while reclaiming space in an arm console and/or glovebox of the vehicle 12.

Figure 9:
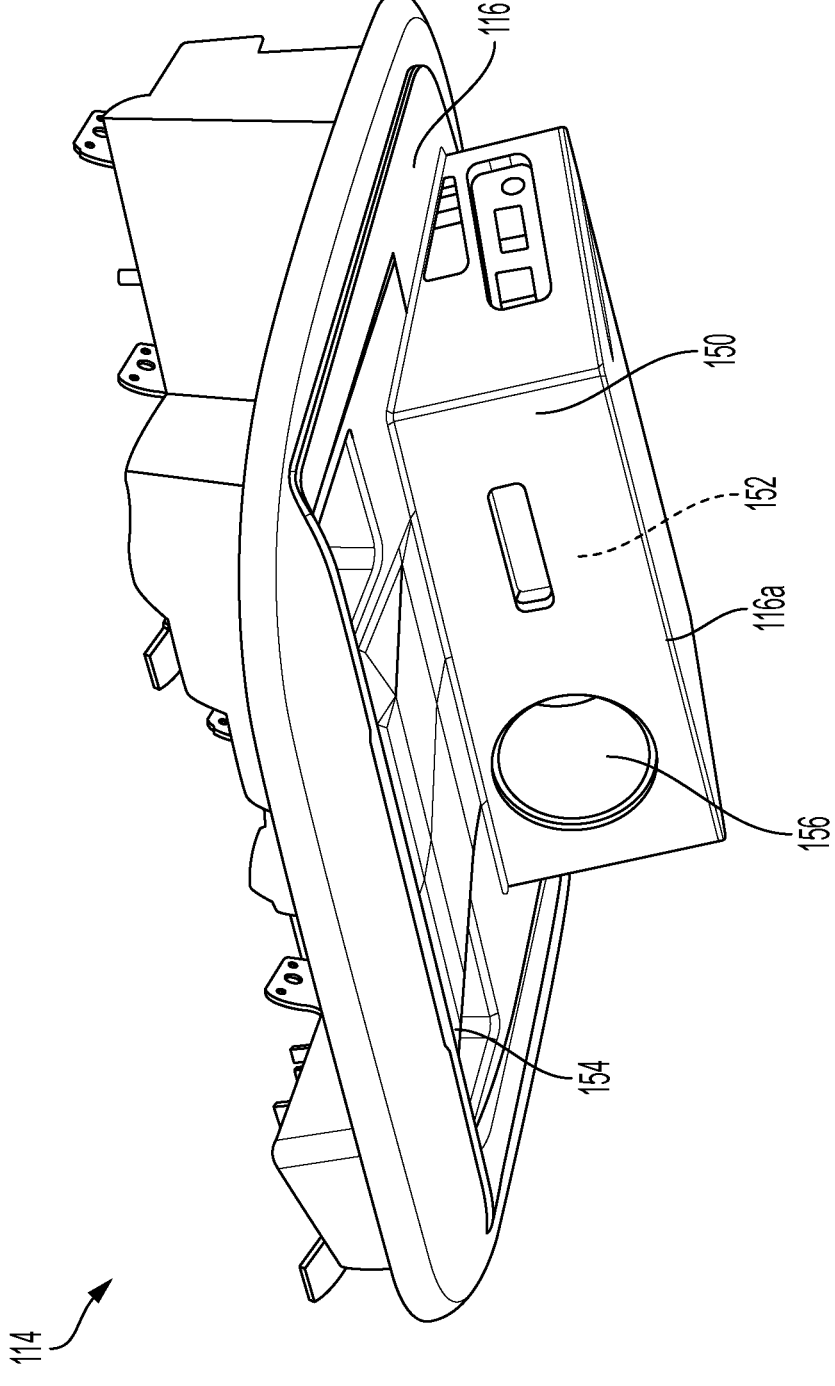
FIGS. 9-11 are additional perspective views of the vehicular overhead console assembly of FIGS. 7 and 8.
Figure 10:
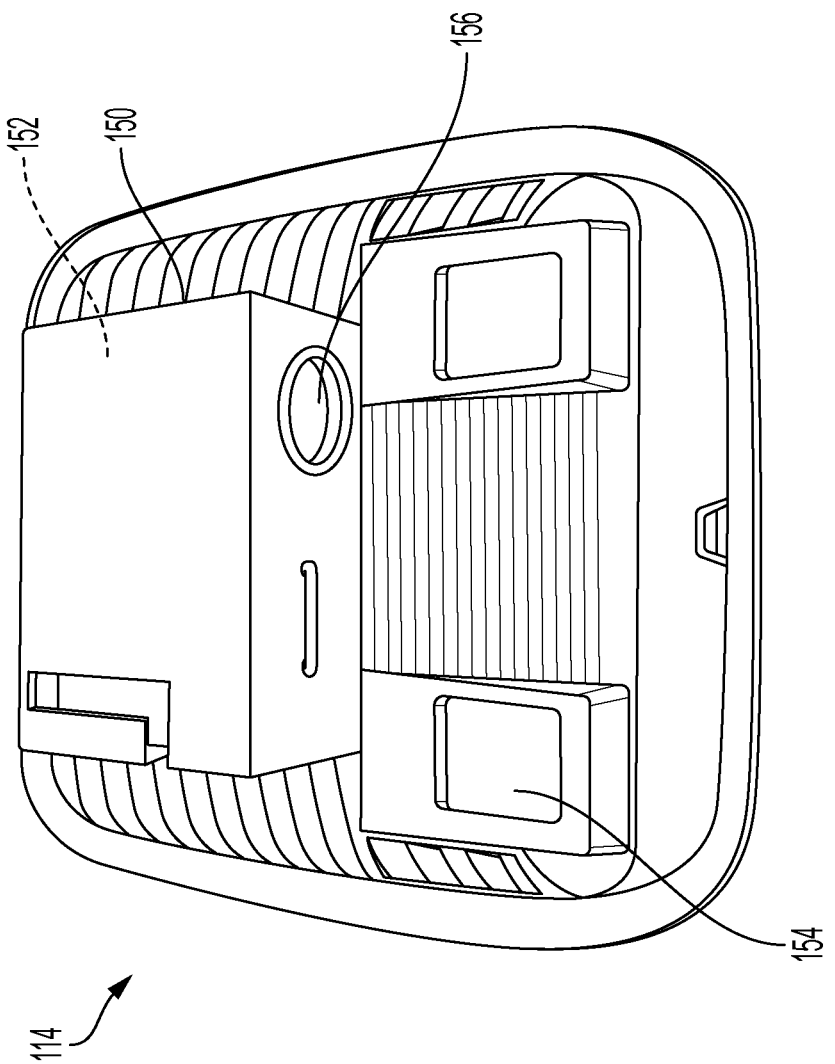
Figure 11:
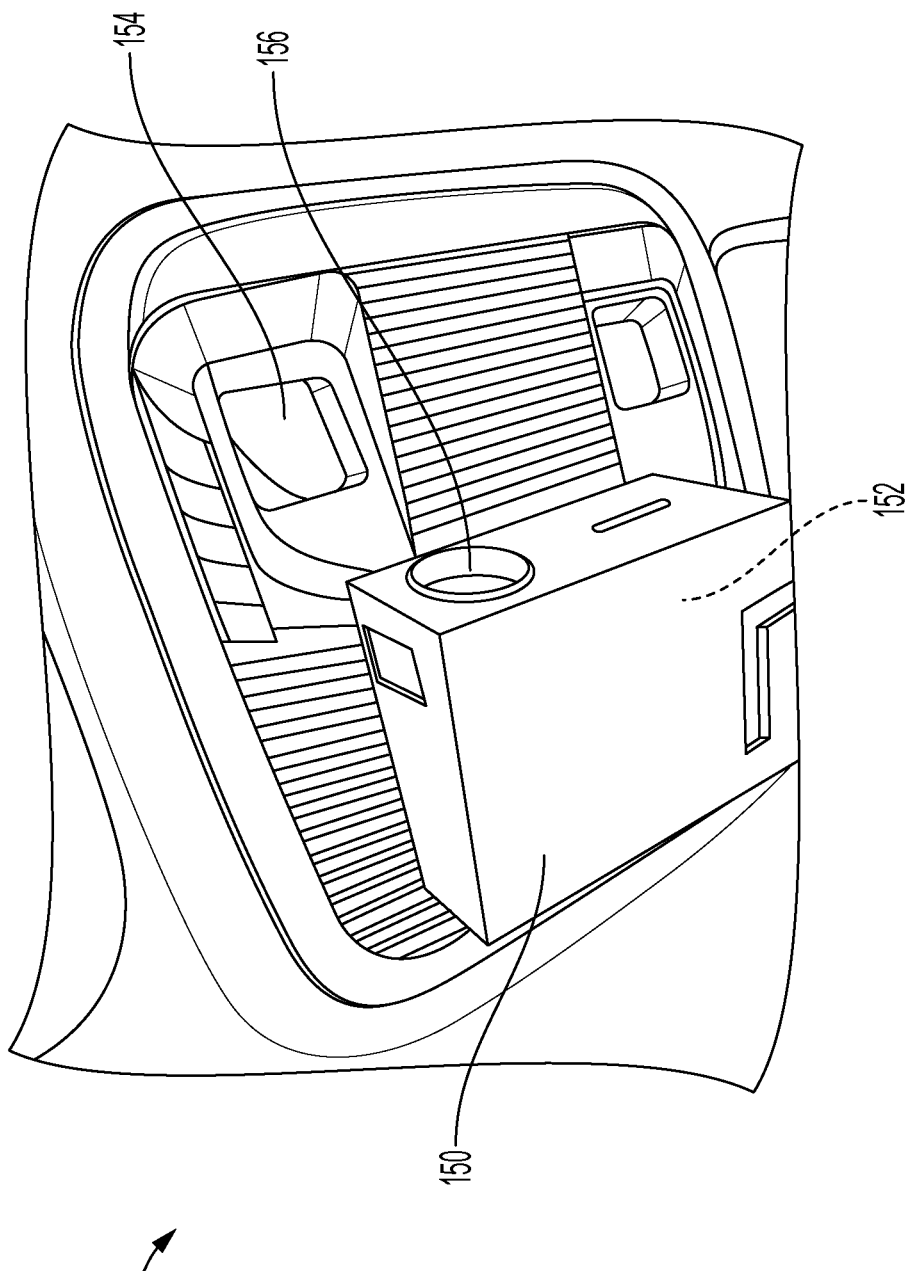

Optionally, the overhead console assembly may include a projection module or projection system for projecting images toward the dashboard or windshield of the vehicle for viewing by the driver of the vehicle. For example, and with reference to FIGS. 7-11, an overhead console assembly 114 includes a chassis or shell or body portion 116 that includes a retaining portion or chamber 116*c* that accommodates a projection module or projection system 150. The projection system 150 is configured to, when electrically operated, project images from the overhead console 114 for viewing at a front dashboard 12*a* or windshield of the vehicle 12. As shown in FIG. 9, the retaining portion extends from the overhead console 114 away from the headliner of the vehicle and may be configured to position the projection system 150 at an angle to direct projected images from the projection system 150 onto the dashboard and/or windshield of the vehicle, such that a driver of the vehicle 12 may view the projected images or information without interfering with operation of the vehicle 12. While the retaining portion 116*c* accommodating the projection system 150 is illustrated as extending from the overhead console 114, the retaining portion 116*c* accommodating the projection system 150 may be flush with the overhead console 114. Additionally or alternatively, the retaining portion 116*c* accommodating the projection system 150 may extend and retract relative to the overhead console 114.

The projection system 150 may include an electronic control unit (ECU) 152 disposed thereat, the ECU 152 including electronic circuitry and associated software configured to provide one or more electronic functions of the system or of an accessory or console of the vehicle. For example, the projection system 150 may share electrical circuitry with lighting accessories 154 (e.g., a reading light or dome light at the overhead console) of the overhead console assembly 114 as the projection system 150 is positioned proximate to the lighting accessories 154 at the overhead console 114. The projection system 150 may include a camera and image processor configured to process image data captured by the camera. The image data may pertain to information regarding the interior or exterior environment of the vehicle (e.g., the camera may comprise a driver monitoring camera or an occupant monitoring camera that captures image data representative of a driver and/or passenger region of the cabin of the vehicle for processing for a driver monitoring system and/or an occupant monitoring system of the vehicle). The projection system 150 includes a light source that emits light for projecting the images and a lens 156 through which the images are projected.

The projected images may be displayed on the dashboard of the vehicle 12, the windshield of the vehicle 12, and/or any suitable interior surface of the vehicle, depending on the orientation and positioning of the lens 156 relative to the front of the vehicle 12. For example, the projection system 150 may display a graphic on the dashboard when the driver enters the vehicle, or may display navigation indications, and/or display caution or warning lights and/or images. In some examples, the light source and/or lens 156 may be movable to direct the images at different portions of the cabin of the vehicle, such as to display images at the A-pillars of the vehicle. For example, the images projected onto the A-pillars may be representative of a scene exterior of the vehicle and within a blind zone caused by the A-pillars of the vehicle obstructing the forward and sideward view of the driver of the vehicle. The projection system 150 may provide an alternative to large center displays on vehicles while providing equivalent information. The projected image data may be in the form of icons, images, text, or any combinations thereof. The projection system 150 thus provides an alternative option to display messages to the driver and/or passenger(s) while minimizing distractions by projecting a clear and bright image and/or media onto the dashboard. In some implementations, the projection system 150 may execute an eye tracking function to determine gaze direction of the driver of the vehicle to determine where the driver is viewing as the vehicle is driven along the road.

Referring now to FIGS. 12-16B, an overhead console assembly 214 includes a chassis or shell or body portion 216 that has a central aperture or central opening 216*c* formed through the body portion 216. When a projection system or projection module or light module 250 is attached at the body portion 216, the projection system 250 may be positioned at or near or aligned with the opening 216*c*. The light module 250 is configured to project light from the overhead console 214 onto a front dashboard 12*a* or windshield of the vehicle 12, such as to display information and/or images to the driver of the vehicle. For example, the light module 250 may be configured to display messages or images as part of a driver alert system while also being operable as a multipurpose light module.

Figure 12:
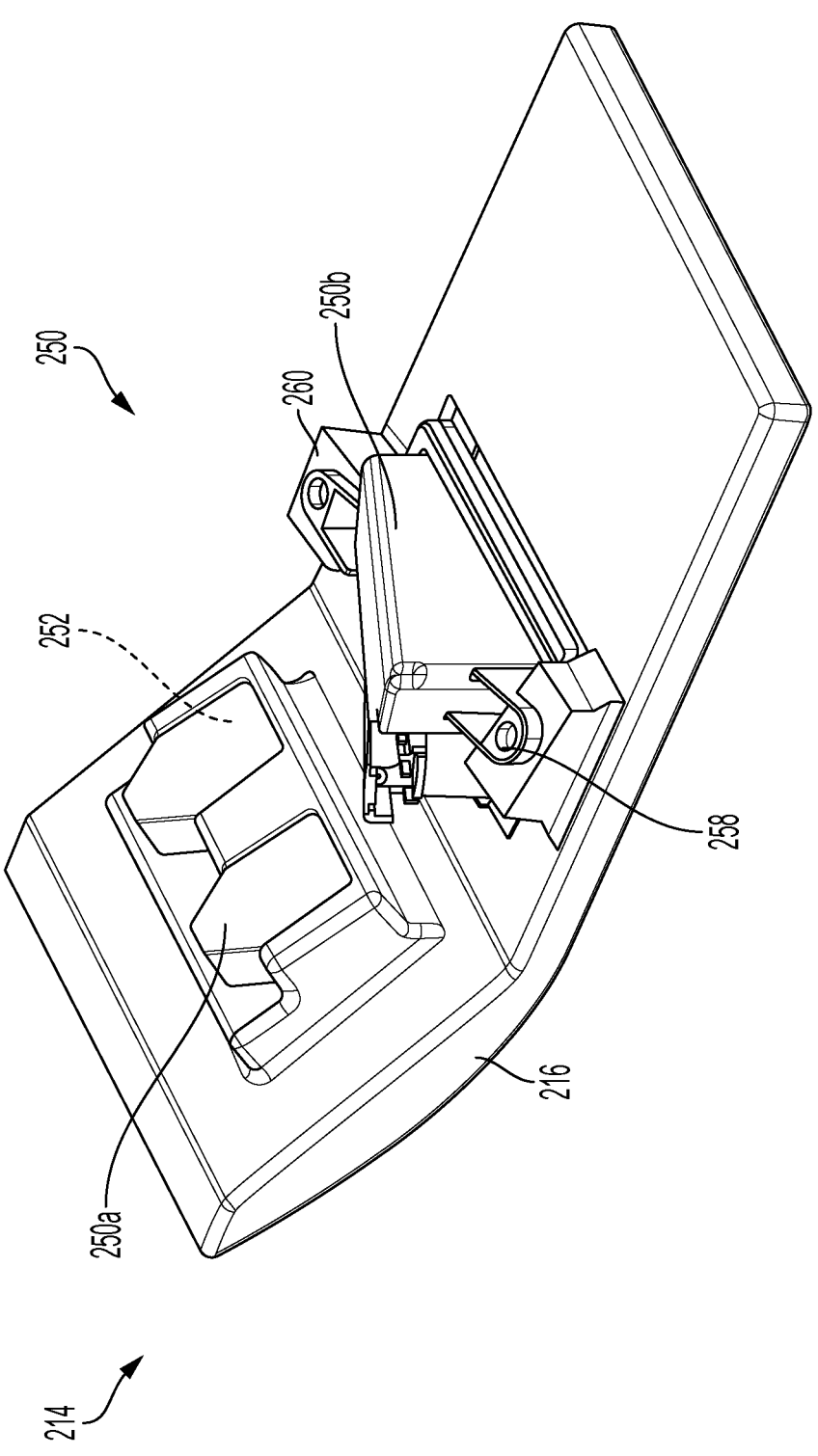
FIGS. 12 and 13 are perspective views of another vehicular overhead console assembly.
Figure 13:
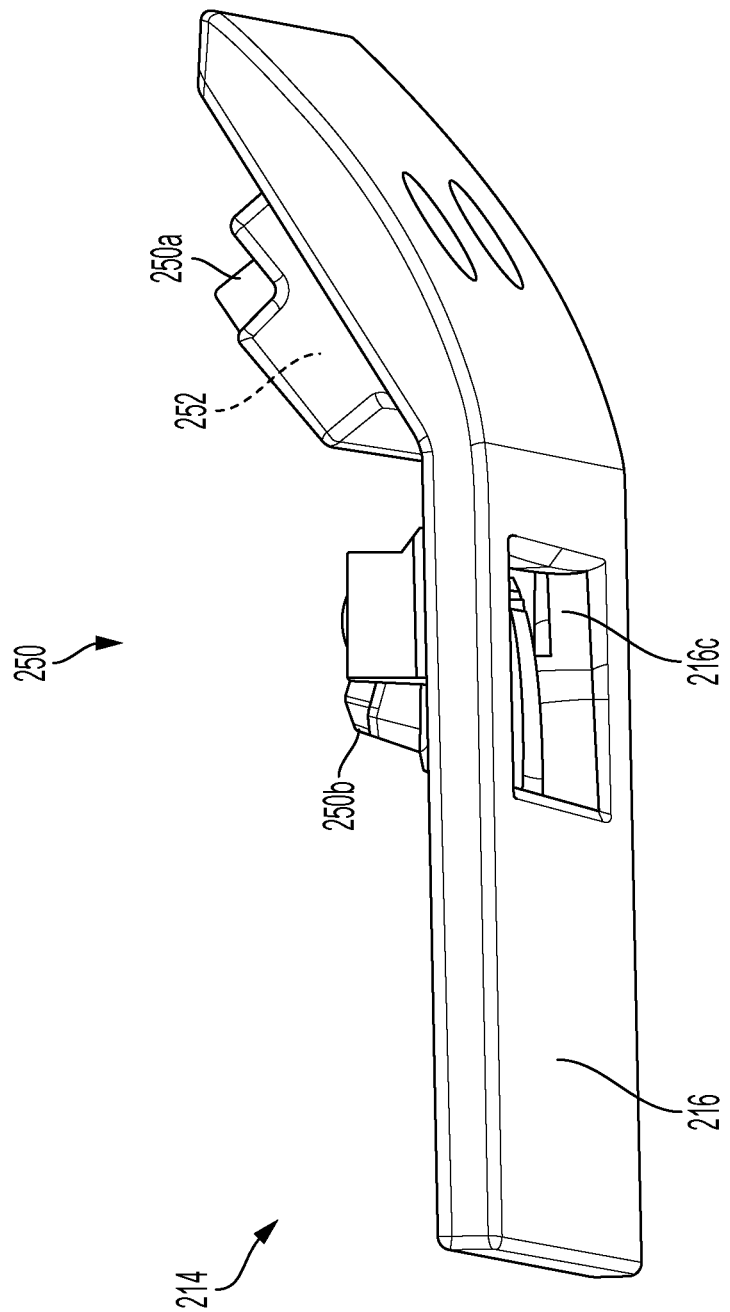
Figure 14:
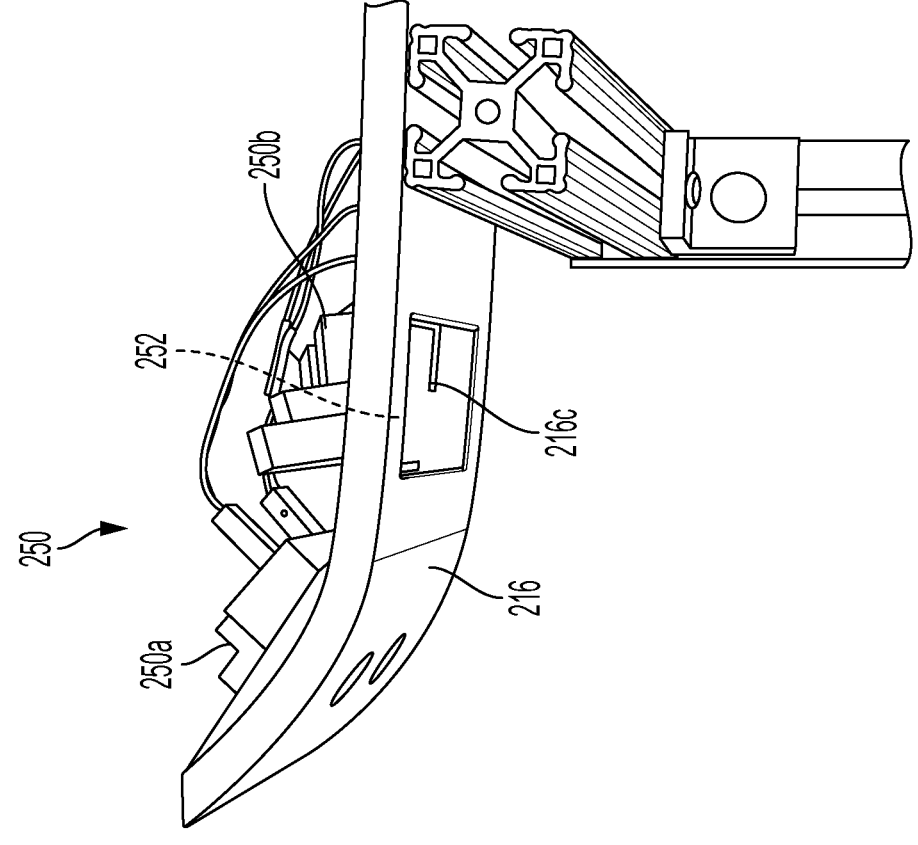
FIGS. 14 and 15 are perspective views of the vehicular overhead console assembly of FIGS. 12 and 13, with a lighting and alert module attached to a body of the vehicular overhead console assembly.
Figure 14:
Figure 15:
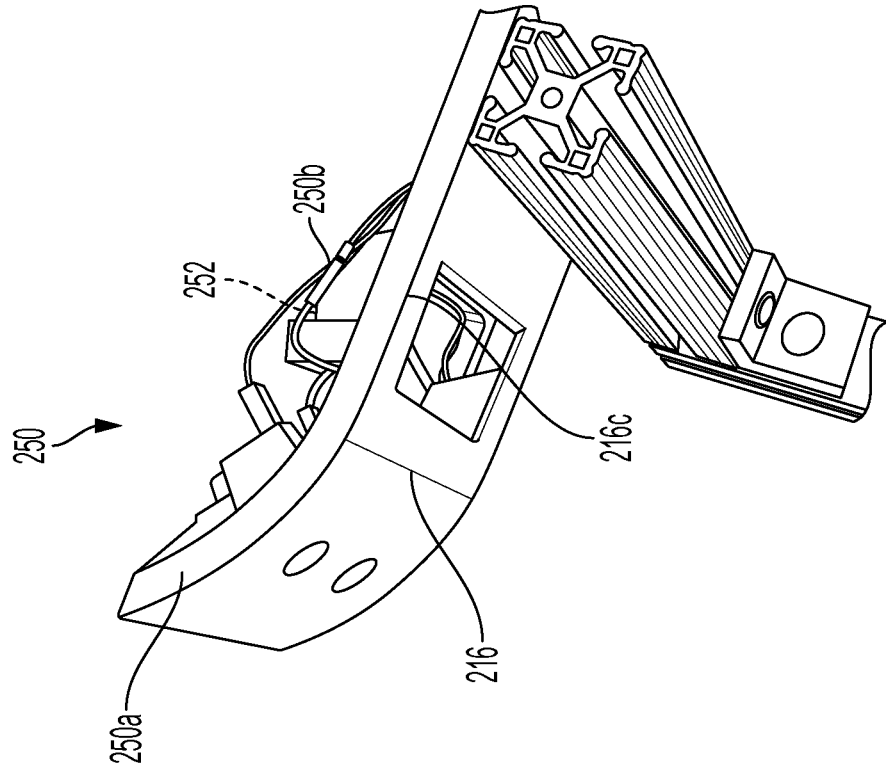
Figure 15:

As shown in FIG. 12, at least a portion of the light module 250 may be attached to the overhead console 214 via support arms 258 extending from the light module 250 and attached at retention blocks 260 of the overhead console 214. That is, the overhead console body portion 216 may include one or more retention blocks 260 or other suitable attachment surfaces at an interior surface of the body portion (e.g., between the body portion 216 and the vehicle headliner) and the support arms 258 may attach at the respective retention blocks 260 to position the light module 250 at or near or aligned with the aperture 216c in the body portion 216. The support arms 258 may be attached to the retention blocks 260 via any practicable fastener, such as adhesive, screws, bolts, and/or rivets. The light module 250 may include at least two light sources or imager lights 250a and a central light source or dome light 250b. The imager lights 250a are configured to simulate at least two different driver alert system messages.

Figure 16:
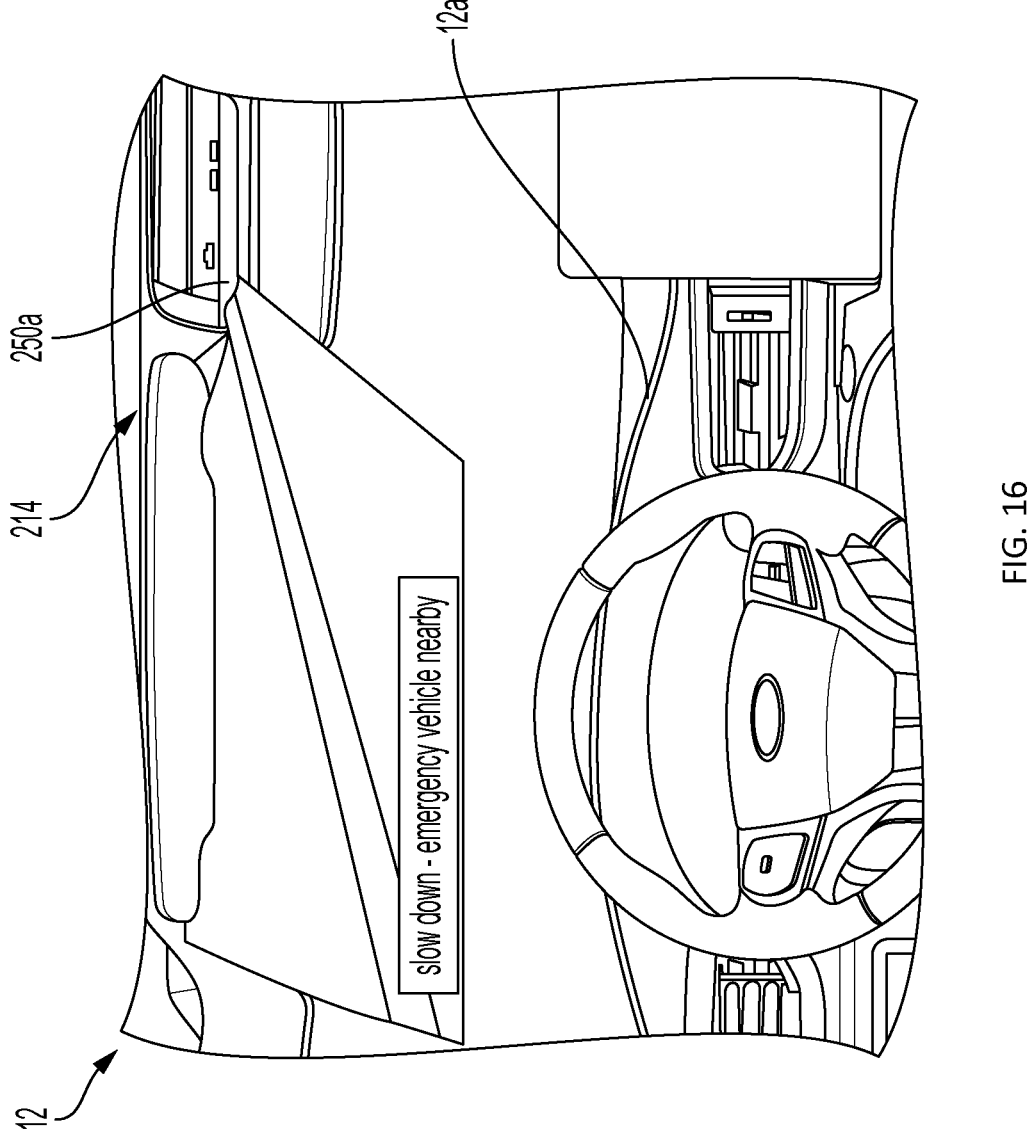
FIG. 16 is a perspective view of the vehicular overhead console assembly of FIGS. 12 and 13 projecting a message onto a windshield of a vehicle.

The light module 250 may receive a signal from one or more systems of the vehicle and may generate and project light to display an appropriate image (e.g., text, icons, images, and the like) onto the dashboard or windshield or other interior surface of the vehicle, such as to inform the driver of a situation or driving condition. For example, and as shown in FIG. 16, the light module may receive a signal and project light from the light source 250a to display a message onto the dashboard or windshield of the vehicle for viewing by the driver of the vehicle. For example, the received signal may correspond to detection of an emergency vehicle in the vicinity of the vehicle 12, and the projected image provides a warning to the driver that an emergency vehicle is nearby and to use caution.

Optionally, the overhead console may provide lighting features or light sources, such as for in-cabin lighting, map reading lights, and/or the like. The light sources may comprise light emitting diodes (LEDs) or micro-LEDs or may comprise other not readily discernible light sources disposed at the light transmitting panel (such that the light sources are covert when not energized and visible when energized). The light sources, when electrically operated to emit light, may emit visible light, such as white light. The light sources may also provide non-visible light, such as near infrared lighting (e.g., the light sources may comprise near-infrared LEDs), such as for use with a driver monitoring system (DMS) or occupant monitoring system (OMS) of the vehicle. Optionally, the overhead console may provide perimeter lighting and/or in-cabin lighting or the like, and may provide user actuatable inputs for controlling the lighting and/or other accessories, such as by utilizing aspects of the overhead consoles described in U.S. Publication No. US-2023-0078512, which is hereby incorporated herein by reference in its entirety.

The overhead console is electrically powered by a power source of the vehicle, such as via connection to a wiring harness of the vehicle. The overhead console may electrically connect to the vehicle wiring harness at the headliner. Thus, the overhead console provides a module that is mounted at an interior portion of the vehicle to provide lighting and/or controls, while also allowing for a larger panoramic roof.

The overhead console thus may house electrical components in addition to the projection system or light module (such as sensors, light sources, etc.). For example, the overhead console may include light sources to provide lighting at the interior portion of the vehicle. For example, the light sources may provide illumination modules such as for an occupant monitoring system (OMS) or driver monitoring system (DMS) (where the light sources may comprise near infrared light emitting light sources or the like), dome lighting, map lights, an illuminated logo, directional lighting, galaxy lighting, and/or ambient or accent lighting at the interior portion of the vehicle. The light source or light sources may comprise one or more light emitting diodes (LEDs) or a plurality of micro-LEDs or vertical-cavity surface-emitting lasers (VCSELs) or the like. The lighting may be adjustable, such as to control the brightness or color of the light emitted by the light sources. Furthermore, the lighting may be electrically operable responsive to a user input or may be automatically energized, such as responsive to opening of a door of the vehicle.

The overhead console may include a human machine interface (HMI) configured to receive a user input, such as to control a system or function of the vehicle. The HMI may be disposed at an underside of the overhead console and, when actuated by a user, control operation of a light or other accessory. For example, the one or more inputs may control function of reading lights of the vehicle or the accent lighting of the overhead console or a system of the vehicle.

The user actuatable HMI of the overhead console may comprise any suitable input, such as switches, buttons, or capacitive sensors. Optionally, the user actuatable input may be provided by a piezo-electric actuator configured to sense the amount of force provided by a user and provide haptic feedback to the user providing the input. Optionally, the user actuatable inputs may be changeable or adjustable, where the function or control provided by a given input may change responsive to a condition of the vehicle or responsive to another user input. For example, the HMI may provide a series of default functions provided by the user actuatable inputs, and upon selection by a user of one of the user actuatable inputs, the HMI may adjust the functions provided by the user actuatable inputs to provide functions based on the initially selected input, such as an initial input selection of a single input to control a sunroof function of the vehicle and subsequent adjustment of the plurality of inputs to provide different functions of the sunroof of the vehicle.

The overhead console and the lighting devices, HMI and other accessories may utilize characteristics of the overhead consoles and window assemblies described in U.S. Pat. Nos. 10,559,153; 10,427,503 and/or 10,272,833 and/or U.S. Patent Pub. No. US-2021-0188092, which are hereby incorporated by reference herein in their entireties.

The overhead console may include user actuatable inputs operable to control any of the accessories of or associated with the overhead console (e.g., telematics buttons). For example, the overhead console may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or U.S. Publication Nos. US-2014-0022390 and/or US-2014-0293169, which are hereby incorporated herein by reference in their entireties, or such as proximity sensors of the types described in U.S. Pat. Nos. 7,224,324; 7,249,860 and/or 7,446,924, and/or U.S. Publication No. US-2006-0050018, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and/or 6,369, 804, which are hereby incorporated herein by reference in their entireties, and/or the like.

Optionally, the overhead console may be integrated or mounted directly to the roof or sunroof or moonroof or panoramic roof of the vehicle, such that a surface of the overhead console may be exposed exterior of the vehicle or is disposed at an at least partially transparent surface (e.g., glass) of the roof of the vehicle. The overhead console may thus include solar cells to capture solar energy as a power source for the vehicle and/or accessories. The overhead console may include an antenna, such as an omnidirectional antenna and/or a radio or communications antenna. Optionally, the overhead console includes drivers for the sunroof or moonroof of the vehicle.

Optionally, one or more sensors (such as a radar sensor or an imaging sensor or camera) may be disposed at the overhead console and capture data representative of a field of sensing interior of the vehicle and the ECU at the overhead console may process the captured data for a system of the vehicle. For example, a camera that views within the interior cabin of the vehicle may capture image data and the ECU may process captured image data such as for a DMS or OMS of the vehicle. The camera may be disposed at or in the overhead console and view through an aperture in the housing or frame of the overhead console or the camera may be disposed at the interior rearview mirror. The camera views interior the vehicle, such as at a head region of the driver of the vehicle, and may utilize characteristics of the DMS described in International Publication Nos. WO 2023/220222; WO 2023/034956; WO 2022/241423 and/or WO 2022/187805, which are hereby incorporated herein by reference in their entireties. By positioning the camera at the overhead console, the camera may provide an enhanced view of the rear seats of the vehicle for an occupant monitoring function.

The console and/or DMS/OMS camera and/or DMS/OMS or head and face direction and/or position tracking systems and/or eye tracking systems and/or gesture recognition systems may utilize aspects of the systems described in U.S. Pat. Nos. 11,518,401; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or WO 2023/220222; WO 2023/034956; WO 2022/241423 and/or WO 2022/187805, which are all hereby incorporated herein by reference in their entireties.

Optionally, the overhead console may include one or more other displays or indicators, such as the types described in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736 and/or US-2010-0097469, which are all hereby incorporated herein by reference in their entireties.

The user actuatable inputs and/or touch sensors and/or proximity sensors and displays described above may be actuatable to control and/or adjust the accessories of the overhead console and/or vehicle. The connection or link between the controls and the display screen device and/or the navigation system and/or other systems and accessories of the overhead console or vehicle may be provided via vehicle electronic or communication systems and the like, and may be connected via various protocols or nodes, such as BLUETOOTH®, SCP, UBP, J1850, CAN J2284, Fire Wire 1394, MOST, LIN, FLEXRAY™, Byte Flight and/or the like, or other vehicle-based or in-vehicle communication links or systems (such as WIFI and/or IRDA) and/or the like, or via VHF or UHF or other wireless transmission formats, depending on the particular application of the overhead console/accessory system and the vehicle. Optionally, the connections or links may be provided via various wireless connectivity or links.

An interior rearview mirror may be mounted at or attached to or integrally formed with the forward frame portion of the overhead console assembly. The interior rearview mirror is adjustably mounted to the overhead console via mounting structure. The mirror reflective element may comprise any suitable mirror reflective element, such as a variable reflectance electro-optic mirror reflective element that varies its reflectance responsive to electrical current applied to conductive coatings or layers of the reflective element, such as a mirror reflective element that utilizes characteristics of the interior rearview mirror assemblies described in U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Optionally, the mirror reflective element may comprise a dual-mode interior rearview video mirror that can switch from a traditional reflection mode to a live-video display mode, such as is by utilizing aspects of the mirror assemblies and systems described in U.S. Pat. Nos. 10,442,360; 10,421,404; 10,166,924 and/or 10,046,706, and/or U.S. Publication Nos. US-2021-0245662; US-2021-0162926; US-2021-0155167; US-2020-0377022; US-2019-0258131; US-2019-0146297; US-2019-0118717 and/or US-2017-0355312, which are hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like.

Changes and modifications in the specifically described embodiments may be carried out without departing from the principles of the present invention, which is intended to be limited only by the scope of the appended claims as interpreted according to the principles of patent law.

The invention claimed is:

1. A vehicular overhead console, the vehicular overhead console comprising:

a housing configured to attach at an interior portion of a cabin of a vehicle equipped with the vehicular overhead console, wherein the housing comprises a pair of openings formed through an exterior wall of the housing, and wherein the pair of openings are spaced from one another;

a pair of cover panels, wherein each cover panel of the pair of cover panels is disposed at a respective opening of the pair of openings of the housing, and wherein each cover panel of the pair of cover panels includes a respective compartment that is configured to accommodate a respective item;

wherein each cover panel of the pair of cover panels is adjustable between (i) a closed position, where the cover panel is disposed at the respective opening with the compartment of the respective cover panel being within the housing, and (ii) an opened position, where the cover panel is moved at least partially away from the respective opening to provide access to the respective compartment;

a mechanical actuator accommodated by the housing and coupled to each cover panel of the pair of cover panels, wherein the mechanical actuator is configured to move the pair of cover panels together and in tandem between the respective closed positions and the respective opened positions; and wherein the mechanical actuator comprises a latch mechanism that, with the pair of cover panels in the respective closed positions, (i) releasably retains the pair of cover panels in the respective closed positions and (ii) responsive to at least one of the cover panels being manually moved from the closed position and further away from the opened position, releases the pair of cover panels to allow the pair of cover panels to move toward the respective opened positions.

2. The vehicular overhead console of claim 1, wherein the mechanical actuator further comprises (i) a spur gear, (ii) a pair of rack gears engaged at opposing sides of the spur gear and (iii) a pair of attachment arms, and wherein each attachment arm of the pair of attachment arms is connected to a respective cover panel of the pair of cover panels and a respective rack gear of the pair of rack gears, and wherein, movement of one cover panel of the pair of cover panels between the closed position and the opened position imparts translational movement of the corresponding rack gear of the pair of rack gears and rotational movement of the spur gear to drive translational movement of the other rack gear of the pair of rack gears and movement of the other cover panel of the pair of cover panels between the closed position and the opened position.

3. The vehicular overhead console of claim 2, wherein translational movement of one rack gear of the pair of rack gears in a first direction drives translational movement of the other rack gear of the pair of rack gears in a second direction, and wherein the second direction is opposite the first direction.

4. The vehicular overhead console of claim 2, wherein the latch mechanism releasably retains one rack gear of the pair of rack gears to releasably retain the pair of cover panels in the respective closed positions, and wherein the latch mechanism releases the one rack gear of the pair of rack gears to release the pair of cover panels.

5. The vehicular overhead console of claim 2, wherein the mechanical actuator comprises a damper element, and wherein, with the pair of cover panels released by the latch mechanism, the damper element limits movement of the pair of cover panels from the respective closed positions toward the respective opened positions.

6. The vehicular overhead console of claim 1, wherein the actuator further comprises a biasing element.

7. The vehicular overhead console of claim 6, wherein the biasing element biases at least one of the cover panels of the pair of cover panels toward the respective opened position.

8. The vehicular overhead console of claim 6, wherein the biasing element biases at least one of the cover panels of the pair of cover panels toward the respective closed position, and wherein, with the pair of cover panels released by the latch mechanism, the biasing element limits movement of the pair of cover panels from the closed positions toward the opened positions.

9. The vehicular overhead console of claim 1, wherein the compartment of each cover panel of the pair of cover panels comprises a shelf portion that extends from an outer cover portion of the cover panel and that, with the cover panel in the respective closed position, is disposed at least partially within the housing.

10. The vehicular overhead console of claim 1, wherein the housing accommodates an electrically operable projector, and wherein, with the housing attached at the interior portion of the cabin of the vehicle, and when the projector is electrically operated, the projector projects an image that is viewable at a surface at the interior portion of the cabin of the vehicle.

11. The vehicular overhead console of claim 10, wherein the projected image comprises an alert generated for a driver of the vehicle.

12. The vehicular overhead console of claim 10, wherein the projected image includes navigation information.

13. The vehicular overhead console of claim 10, wherein the projected image comprises video images generated based on image data captured by a camera at the vehicle.

14. The vehicular overhead console of claim 10, wherein the surface comprises at least one selected from the group consisting of (i) a windshield of the vehicle, (ii) a dashboard of the vehicle and (iii) an A-pillar of the vehicle.

15. A vehicular overhead console, the vehicular overhead console comprising:

a housing configured to attach at an interior portion of a cabin of a vehicle equipped with the vehicular overhead console, wherein the housing comprises a pair of openings formed through an exterior wall of the housing, and wherein the pair of openings are spaced from one another;

a pair of cover panels, wherein each cover panel of the pair of cover panels is disposed at a respective opening of the pair of openings of the housing, and wherein each cover panel of the pair of cover panels includes a respective compartment that is configured to accommodate a respective item;

wherein each cover panel of the pair of cover panels is adjustable between (i) a closed position, where the cover panel is disposed at the respective opening with the compartment of the respective cover panel being within the housing, and (ii) an opened position, where the cover panel is moved at least partially away from the respective opening to provide access to the respective compartment;

wherein the compartment of each cover panel of the pair of cover panels comprises a shelf portion extends from an outer cover portion of the cover panel and that, with the cover panel in the respective closed position, is disposed at least partially within the housing;

a mechanical actuator accommodated by the housing and coupled to each cover panel of the pair of cover panels, wherein the mechanical actuator is configured to move the pair of cover panels together and in tandem between the respective closed positions and the respective opened positions;

wherein the mechanical actuator comprises (i) a spur gear, (ii) a pair of rack gears engaged at opposing sides of the spur gear, (iii) a pair of attachment arms and (iv) a latch mechanism;

wherein each attachment arm of the pair of attachment arms is connected to a respective cover panel of the pair of cover panels and a respective rack gear of the pair of rack gears, and wherein, movement of one cover panel of the pair of cover panels between the closed position and the opened position imparts translational movement of the corresponding rack gear of the pair of rack gears and rotational movement of the spur gear to drive translational movement of the other rack gear of the pair of rack gears and movement of the other cover panel of the pair of cover panels between the closed position and the opened position; and wherein the latch mechanism, with the pair of cover panels in the respective closed positions, (i) releasably retains one rack gear of the pair of rack gears to retain the pair of cover panels in the respective closed positions and (ii) responsive to at least one of the cover panels being manually moved from the closed position and further away from the opened position, releases the one rack gear of the pair of rack gears to release the pair of cover panels to allow the pair of cover panels to move toward the respective opened positions.

16. The vehicular overhead console of claim 15, wherein the actuator further comprises a biasing element.

17. The vehicular overhead console of claim 16, wherein the biasing element biases at least one of the cover panels of the pair of cover panels toward the respective opened position.

18. The vehicular overhead console of claim 16, wherein the biasing element biases at least one of the cover panels of the pair of cover panels toward the respective closed position, and wherein, with the pair of cover panels released by the latch mechanism, the biasing element limits movement of the pair of cover panels from the closed positions toward the opened positions.

19. A vehicular overhead console, the vehicular overhead console comprising:

a housing configured to attach at an interior portion of a cabin of a vehicle equipped with the vehicular overhead console, wherein the housing comprises a pair of openings formed through an exterior wall of the housing, and wherein the pair of openings are spaced from one another;

a pair of cover panels, wherein each cover panel of the pair of cover panels is disposed at a respective opening of the pair of openings of the housing, and wherein each cover panel of the pair of cover panels includes a respective compartment that is configured to accommodate a respective item;

wherein each cover panel of the pair of cover panels is adjustable between (i) a closed position, where the cover panel is disposed at the respective opening with the compartment of the respective cover panel being within the housing, and (ii) an opened position, where the cover panel is moved at least partially away from the respective opening to provide access to the respective compartment;

a mechanical actuator accommodated by the housing and coupled to each cover panel of the pair of cover panels, wherein the mechanical actuator is configured to move the pair of cover panels together and in tandem between the respective closed positions and the respective opened positions;

wherein the mechanical actuator comprises (i) a spur gear, (ii) a pair of rack gears engaged at opposing sides of the spur gear, (iii) a pair of attachment arms, (iv) a latch mechanism and (v) a damper element;

wherein each attachment arm of the pair of attachment arms is connected to a respective cover panel of the pair of cover panels and a respective rack gear of the pair of rack gears, and wherein, movement of one cover panel of the pair of cover panels between the closed position and the opened position imparts translational movement of the corresponding rack gear of the pair of rack gears in a first direction and rotational movement of the spur gear to drive translational movement of the other rack gear of the pair of rack gears in a second direction and movement of the other cover panel of the pair of cover panels between the closed position and the opened position, and wherein the second direction is opposite the first direction;

wherein the mechanical actuator comprises a latch mechanism that, with the pair of cover panels in the respective closed positions, (i) releasably retains the pair of cover panels in the respective closed positions and (ii) responsive to at least one of the cover panels being manually moved from the closed position and further away from the opened position, releases the pair of cover panels to allow the pair of cover panels to move toward the respective opened positions; and wherein, with the pair of cover panels released by the latch mechanism, the damper element limits movement of the pair of cover panels from the respective closed positions toward the respective opened positions.

20. The vehicular overhead console of claim 19, wherein the actuator further comprises a biasing element, and wherein the biasing element biases at least one of the cover panels of the pair of cover panels toward the respective opened position.

* * * * *